United States Patent [19]
Toda

[11] 3,799,567
[45] Mar. 26, 1974

[54] COLLAPSIBLE BABY CART
[75] Inventor: Tokuzo Toda, Tokyo, Japan
[73] Assignee: Tokyo Baby Inc., Tokyo, Japan
[22] Filed: June 21, 1972
[21] Appl. No.: 264,850

[30] Foreign Application Priority Data
Dec. 29, 1971 Japan .............................. 47-4894

[52] U.S. Cl. .............................................. 280/36 B
[51] Int. Cl. ............................................. B62b 11/00
[58] Field of Search .............. 280/36 B, 41 A, 41 B

[56] References Cited
UNITED STATES PATENTS

| | | | |
|---|---|---|---|
| 3,000,646 | 9/1961 | Kummeth | 280/41 B |
| 3,561,787 | 2/1971 | Toda | 280/41 A |
| 2,612,209 | 9/1952 | Alldredge | 280/36 B |
| 742,100 | 10/1903 | Tillinghast | 280/41 A |
| 3,019,028 | 1/1962 | Hedstrom | 280/36 B |

Primary Examiner—Robert R. Song
Attorney, Agent, or Firm—McGlew and Tuttle

[57] ABSTRACT

A collapsible baby cart has a substantially U-shaped tubular hammock supporting frame defining a pair of substantially horizontal arms, a pair of front legs each extending donwwardly from the forward end of a respective arm and a back rest extending upwardly from the rear ends of the arms. A substantially U-shaped rear leg member is pivotally secured to the arms of the frame to project rearwardly and downwardly therefrom, and a U-shaped control handle is pivotally secured to the back rest to project upwardly substantially parallel thereto and therebeyond. Links connect the control handle to the rear leg member, and releasable latch means connect the control handle to the back rest to retain the baby cart in erected position. The lower ends of the legs rotatably support wheels, and a wire basket is rockably mounted on the rear leg member and connected by links to the arms, the basket being permanently connected to the baby cart.

9 Claims, 7 Drawing Figures

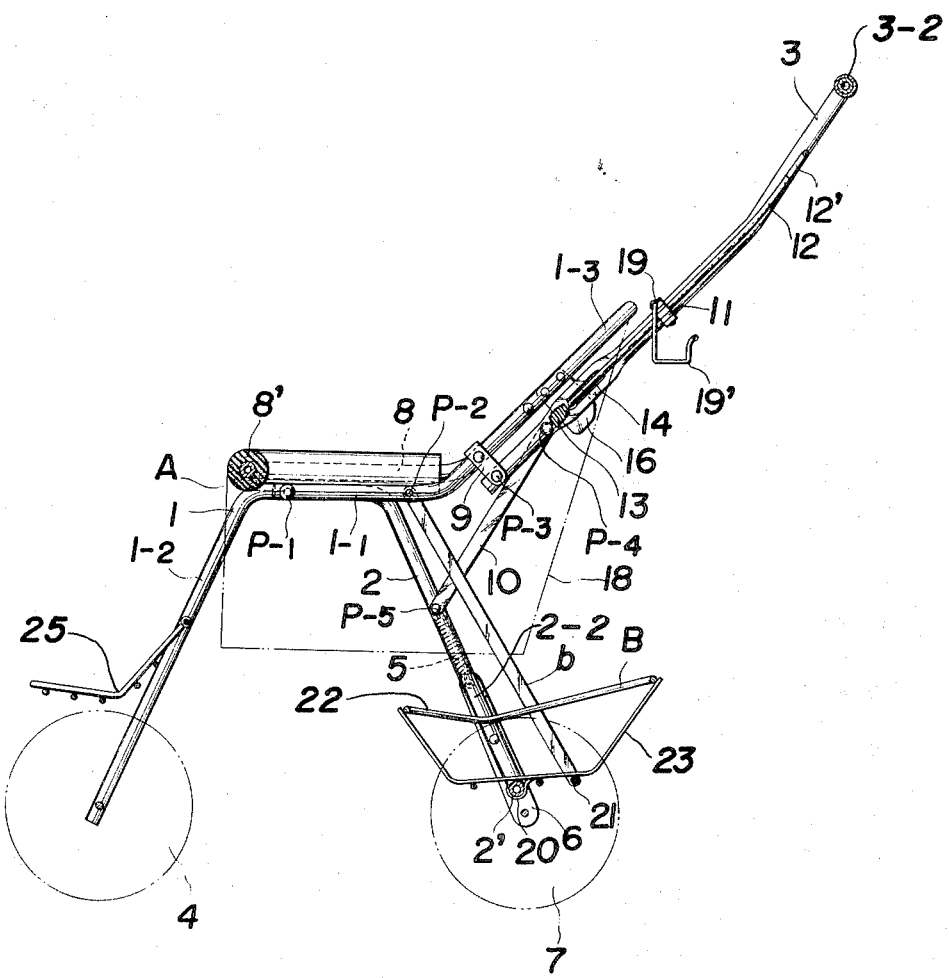

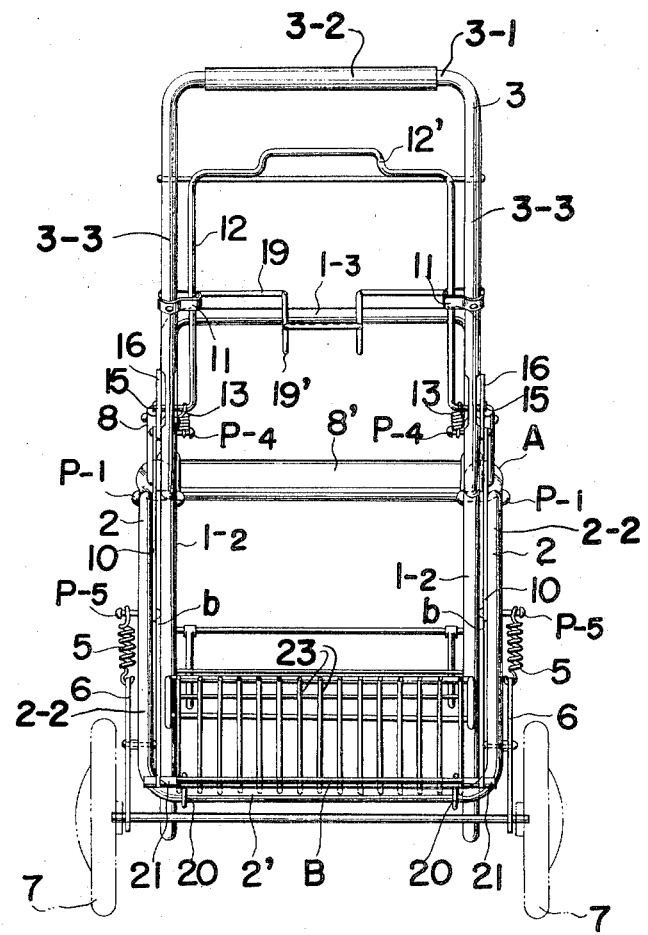

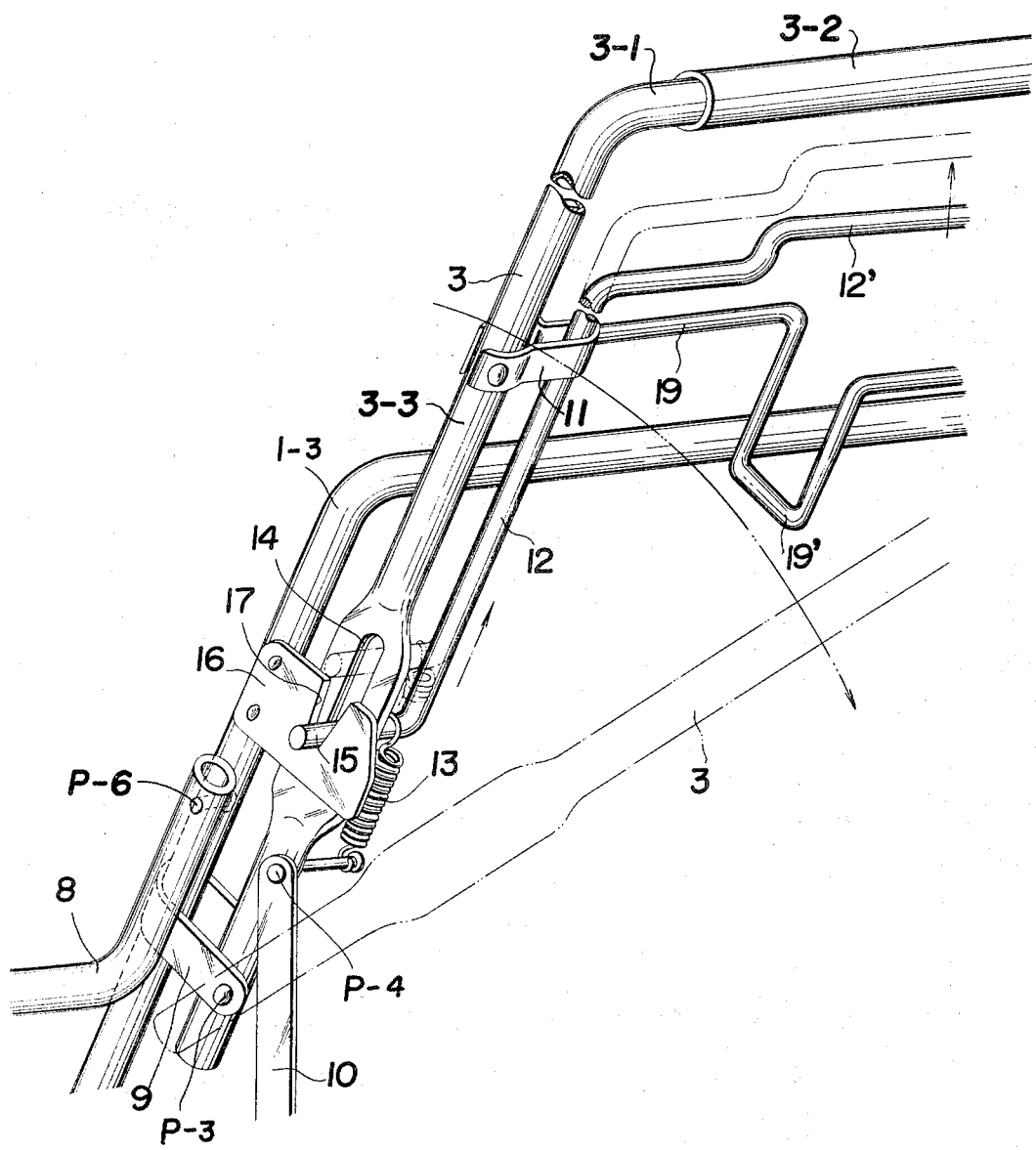

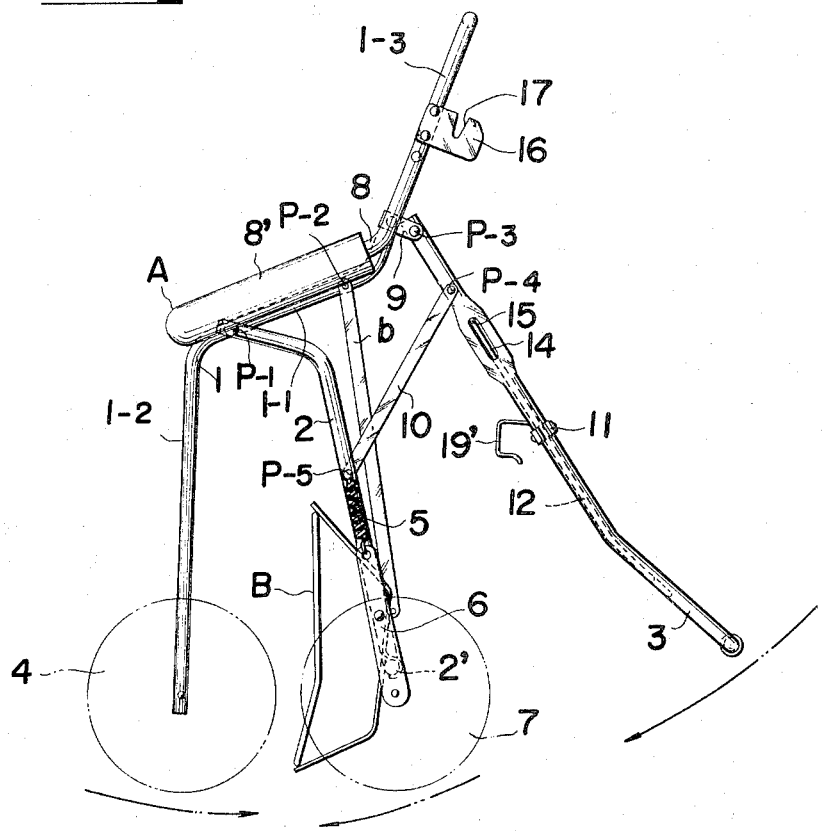
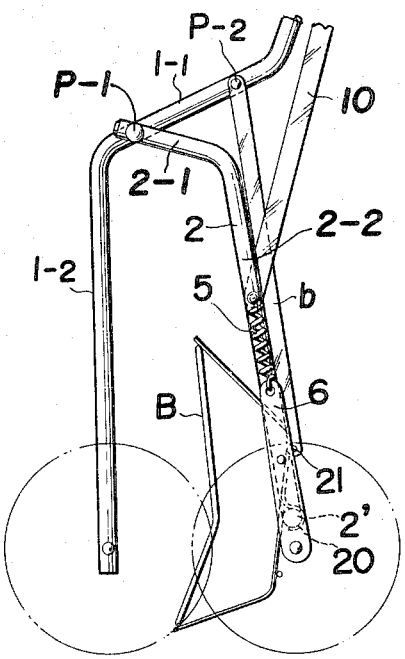

COLLAPSIBLE BABY CART

FIELD AND SUMMARY OF THE INVENTION

This invention relates to collapsible baby carts and, more particularly, to a small size baby cart which can be folded and erected easily and which is portable in a folded state.

To this end, the baby cart includes a substantially U-shaped tubular hammock support frame with the legs of the U each defining a horizontal arm, a front leg extending downwardly from the forward end of the arm and a back rest extending upwardly from the rear end of the arm, the two back rests being interconnected by the bight of the frame. A substantially U-shaped tubular rear leg member has a pair of laterally spaced rear legs each pivotally connected, at their ends, to a respective arm to project rearwardly and downwardly therefrom, with the bight of the U-shaped rear leg member extending horizontally to interconnect the lower ends of the two rear legs.

A substantially U-shaped tubular control handle has the lower ends of the arms of the U pivotally connected to the back rest, and the handle extends upwardly substantially parallel to the back rest to project upwardly therebeyond. Respective links each articulatedly interconnect a control handle leg and a respective rear leg.

A substantially U-shaped latching member has a pair of legs each slidably supported in strap loops secured to a leg of the control handle, the legs of the latch operating member having their lower ends projecting outwardly and through elongated slots in the legs of the control handle to engage in notches in respective latching plates secured to the legs of the back rest. Springs bias the latching member into a latching position, but allow the latching member to be pulled upwardly to release the latching of the control handle to the back rest.

A wire basket is oscillatably mounted, intermediate its ends, on the cross member or bight of the rear leg member, and articulatedly connected by links to the arms of the support frame, this wire basket remaining permanently connected to the baby cart.

An object of the invention is to provide a collapsible baby cart which can be folded and erected by a person having an upright comfortable posture.

Another object of the invention is to provide such a collapsible baby cart which includes a shopping basket and which can be folded and erected without removing the shopping basket therefrom.

A further object of the invention is to provide such a collapsible baby cart which, in its folded condition, can be readily and easily transported.

For an understanding of the principles of the invention, reference is made to the following description of a typical embodiment thereof as illustrated in the accompanying drawing.

BRIEF DESCRIPTION OF THE DRAWINGS

In the Drawings:

FIG. 1 is a vertical sectional view through a collapsible baby cart embodying the invention;

FIG. 2 is a rear elevation view of the baby cart as shown in FIG. 1;

FIG. 3 is a partial perspective view of the baby cart showing the latching mechanism in a latching position;

FIG. 4 is a side elevation view illustrating the baby cart when folded half way;

FIG. 5 is a view, similar to FIG. 4, illustrating the essential components of the baby cart in a completely folded state;

DESCRIPTION OF THE PREFERRED EMBODIMENT

Figure 6:
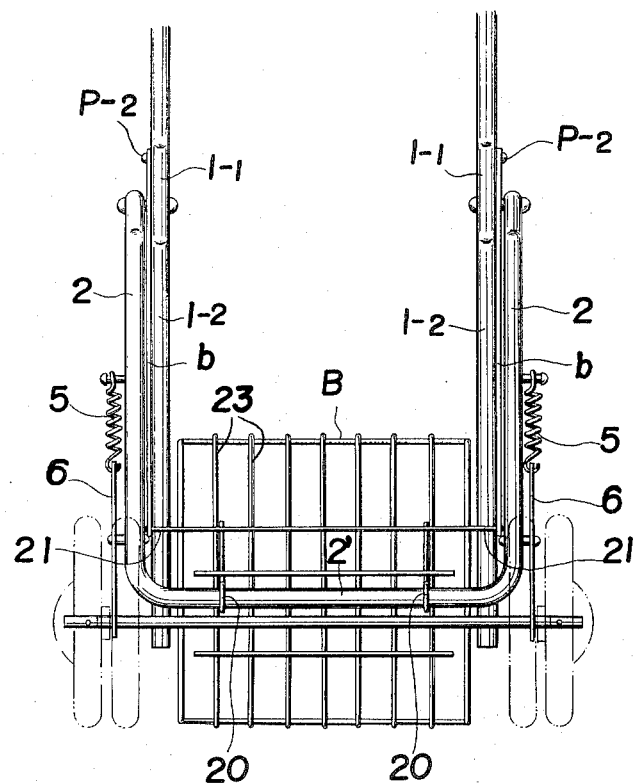
FIG. 6 is a rear elevation view corresponding to FIG. 5.

Referring to the drawings, a collapsible baby cart embodying the invention is generally indicated at A as comprising a hammock support frame 1, a rear leg member 2 and a control handle 3. Frame 1 is substantially U-shaped and the legs of the U are bent to define horizontal arms 1—1, front legs 1-2 and a back rest 1-3, the two legs of the back rest being interconnected by the bight of the support frame. Each front leg 1-2 projects downwardly from the front end of a respective horizontal arm 1—1, and each leg 1-3 of the back rest projects upwardly from the rear end of a respective horizontal arm 1—1, the legs of the back rest being interconnected, at their upper ends, by the bight of the U-shaped back rest.

Figure 7:
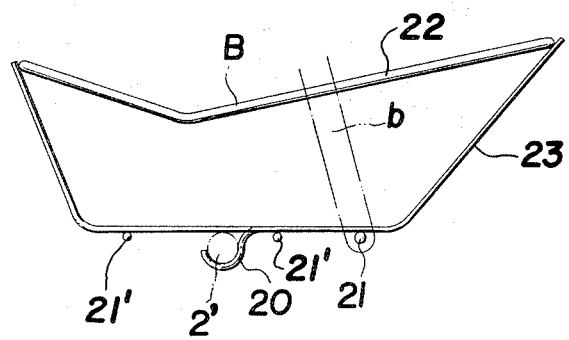
FIG. 7 is a side elevation view of the shopping basket permanently secured to the baby cart.

Each leg of the rear leg member is bent to form a relatively short section 2-1 pivotally interconnected by a pin P-1 to a horizontal arm 1—1 adjacent the forward end of the latter. A longer section 2—2 of each leg of the rear leg member 2 extends rearwardly and downwardly from the rear end of the shorter section 2-1. The sections 2—2 are interconnected, at their lower ends, by a bight 2' which oscillatably supports a wire shopping backet B. Shopping basket B comprises a substantially rectangular upper wire frame 22 to the transverse members of which are connected a plurality of substantially parallel wire bars 23 which, as best seen in FIGS. 1 and 7, define a substantially hopper-or trough-shape basket. The horizontal portions of wires 23 are interconnected by cross wires 21' and 21, with the cross wires 21 projecting outwardly from each side of basket B. As best seen in FIGS. 2 and 7, the laterally outermost wires 23 each have a half-ring or hook member 20 secured thereto and embracing the bight 2' of leg member 2 to oscillatably support basket B on bight 2'. A pair of links b, b are pivotally connected to the projecting ends of cross wire 21, at their lower ends, and their upper ends are pivotally connected through respective pins P-2 to the rear portions of horizontal arms 1—1 of support frame 1.

Front wheels 4 are rotatably mounted on the lower ends of front legs 1-2, which pivotally support a wire mesh foot rest 25, as best seen in FIG. 1. Support arms 6 are pivotally connected, intermediate their ends, to the lower ends of the portions 2—2 of rear leg member 2, and each support arm 6 has a rear wheel 7 rotatably secured to one end thereof. The opposite ends of support arm 6 are connected by respective shock absorbing springs 5 to pins P-5 on leg member portions 2—2.

Bent back rest arms 8 are pivotally connected, at pivots P-6, to each of the back rest portions 1-3 of frame 1, and each back rest arm includes a substantially horizontally extending portion extending parallel to the adjacent arm portion 1—1 of frame 1. Each horizontal portion is covered by a plastic material covering 8' so as to provide a smooth surface. It should be noted that the leg portions 2-1 of back leg member 2 are positioned outside of the arm portions 1—1 of frame 1.

At the lower end of each leg of the back rest 1-3, a respective U-shaped strap 9 is riveted thereto and the lower ends of the control handle 3 are pivotally connected to straps 9 through pivot pins P-3. Thereby, control handle 3 can be pivoted upwardly or downwardly relative to back rest 1-3. A bar 19 extends transversely between the legs of control handle 3, and is secured at its opposite ends to these legs. Transverse bar 19 has a hook portion 19' intermediate its ends, on which a shopping basket or the like may be suspended. A suitable covering 3-2 may be provided for the bight portion 3-1 of control handle 3.

A pair of links 10 are pivotally secured by respective pivots P-4 to the lower ends of the legs 3—3 of control handle 3, and are pivotally secured at their lower ends to the pins P-5 on legs 2—2 of rear leg member 2, these being the pins to which the upper ends of shock absorber springs 5 are connected. Links 10 provide for coordinated movement between rear leg member 2 and control handle 3 during erection and folding of the baby cart.

A baby seat is formed by suspending a hammock 18 between horizontal arms 1—1 of frame 1 and the bight of back rest 1-3.

The legs 3—3 of control handle 3 have secured thereto loop-forming straps 11 which slidably receive the legs of a U-shaped lifting or latch release member 12. The lower ends of the legs of member 12 are bent outwardly, as at 15, to extend through elongated slots 14 in flattened portions of the legs 3—3 of control handle 3. The bight of the U-shaped lifting or latching member 12 is positioned in the upper section of the space delimited by control handle 3. Springs 13, each connected between a bent end 15 of a leg of member 12 and pivot pins P-4 serve to bias member 12 downwardly, while permitting upward movement thereof against the bias of these springs.

The bent ends 15 are arranged to engage in upwardly opening notches 17 in plates 16 riveted to the legs of control handle 1-3, to latch control handle 3 in the erected position of the baby cart A. The hooking mechanism comprising bent ends 15, plates 16 and notches 17 may be replaced by any suitable type of latching mechanism which can be operated by lifting member 12.

The erected baby cart body A can be folded by manually lifting latch release member 12' against the bias of springs 13, and then pressing control handle 3 downwardly and backwardly to a position where bent ends 15 are disengaged out of notches 17 so that rear leg member 2 is moved, through links 10, toward front legs 1-2 of main frame 1, as best illustrated in FIGS. 4 and 5. During folding of the baby cart, basket B rocks forwardly as rear leg member 2 approaches front legs 1-2, and basket B is received, in a roughly inverted state, between the front and rear legs 1-2 and 2, when the cart body A is completely folded.

With the parts in the folded position, by lifting control handle 3, the front and rear legs are moved apart from each other and the bent ends 15 move upwardly along the outer edges of plate 16 to fall automatically within groove 17 under the bias of springs 13, so that the cart body is maintained in the erected state. In the erected state, basket B is supported horizontally by means of the links b.

Thus, with the baby cart of the present invention, the folding can be performed merely by pressing control handle 3 rearwardly and downwardly, after lifting of member 12, and the erection operation can be completed merely by lifting control handle 3 upwardly and forwardly. In other words, both the folding and the erecting operations can be carried out quite easily at a touch and, moreover, the latching mechanisms of the cart body can be released while the user is standing erect, that is, release member 12 can be moved upwardly relative to the upper end of control handle 3.

As a result, the baby cart of the present invention, as distinguished from conventional baby carriages, can be folded easily without the user stooping down. Furthermore, as control handle 3 extends upwardly in the folded and inverted position of the baby cart, the cart is portable using control handle 3, which is a highly advantageous feature.

In addition, basket B rocks forwardly and backwardly in accordance with the folding and erecting operations of the baby cart, and it can be received compactly between arms of the baby cart. As a result, it is not necessary, with the present invention, to remove the basket when folding the baby cart. In other words, the baby cart can be folded and erected with the basket remaining attached thereto in both conditions. As basket B is always attached to the baby cart, disadvantages such as forgetting or misplacing basket B can be avoided.

While a specific embodiment of the invention has been shown and described in detail to illustrate the application of the principles of the invention, it will be understood that the invention may be embodied otherwise without departing from such principles.

What is claimed is:

1. A collapsible baby cart comprising, in combination, a hammock support frame including a pair of laterally spaced members each having a horizontal arm portion, a front leg extending downwardly from the forward end of said arm portion, and a back rest portion extending upwardly from the rear of said arm portion; a rear leg member including a pair of laterally spaced rear legs each pivoted to a respective arm portion to project rearwardly and downwardly therefrom; a control handle including a pair of laterally spaced handle arms each pivotally secured to a respective back rest portion and projecting upwardly substantially parallel thereto and therebeyond; respective links each articulatedly interconnecting one of said handle arms and a respective one of said rear legs, and releasable latch means connecting each handle arm to the adjacent back rest portion to retain the baby cart in erected position; said baby cart being collapsible by releasing said latch means, and swinging said control handle rearwardly and downwardly to juxtapose said rear leg member to said front legs.

2. A collapsible baby cart, as claimed in claim 1, in which each of said hammock support frame, said rear leg member and said control handle is a U-shaped tubular element including a pair of elongated portions extending from opposite ends of a transverse substantially rectilinear bight.

3. A collapsible baby cart, as claimed in claim 2, in which said releasable latch means comprises hook members secured to each back rest portion and a latching member mounted for sliding movement along said control handle and having latch means engageable in said hook members.

4. A collapsible baby cart, as claimed in claim 3, including means biasing said latching member in a direction to engage its latch means in said hook members.

5. A collapsible baby cart, as claimed in claim 4, in which said latching member is a substantially U-shaped element including a bight extending transversely between the arms of said control handle and a pair of legs each extending downwardly parallel to a respective leg of said control handle; guide means on each arm of said control handle slidably receiving the associated leg of said latching member; the legs of said control handle being formed with relatively elongated slots; said latch means comprising outwardly bent ends of the legs of said latching member extending through said slots to engage said hook members.

6. A collapsible baby cart, as claimed in claim 5, in which said hook members comprise plates each secured to a respective back rest portion and each formed with an upwardly opening notch arranged to have said bent ends engaged therein.

7. A collapsible baby cart, as claimed in claim 2, in which the bight of said rear leg member interconnects the bottom ends of said rear legs; and a basket oscillatably mounted, intermediate its ends, on said bight.

8. A collapsible baby cart, as claimed in claim 7, including a pair of links articulatedly interconnecting said basket and said horizontal arm portions to rock said basket when said baby cart is folded.

9. A collapsible baby cart, as claimed in claim 2, including arm rests having portions extending along said back rest portions and pivotally secured thereto, and including horizontal portions extending along said horizontal arms; and protective means covering said horizontal portions.

* * * * *